United States Patent [19]

Krieg

[11] Patent Number: 4,788,027
[45] Date of Patent: Nov. 29, 1988

[54] METHOD AND MEANS FOR REMOTE REMOVAL OF GUIDE BALLS FROM NUCLEAR REACTOR CONTROL RODS

[76] Inventor: Adrian H. Krieg, 119 Maplevale Dr., Woodbridge, Conn. 06525

[21] Appl. No.: 73,152

[22] Filed: Jul. 14, 1987

[51] Int. Cl.[4] .............................................. G21C 19/00
[52] U.S. Cl. ..................................... 376/260; 30/277; 30/286; 83/917
[58] Field of Search .................. 376/260; 30/280, 286, 30/289, 277, 367, 125; 72/420, 461; 83/559, 693, 917, 923; 114/221 A; 252/626

[56] References Cited

U.S. PATENT DOCUMENTS

| | | | |
|---|---|---|---|
| 2,529,210 | 11/1950 | Butler | 30/286 |
| 3,815,492 | 6/1974 | Simmers | 83/923 |
| 4,006,527 | 2/1977 | Sivachenko | 83/917 |
| 4,257,292 | 3/1981 | Faull | 83/559 |
| 4,434,092 | 2/1984 | Mary | 252/626 |
| 4,633,743 | 1/1987 | Ichikawa | 83/693 |
| 4,643,845 | 2/1987 | Omote et al. | 376/260 |
| 4,648,989 | 3/1987 | Klein | 376/260 |
| 4,747,995 | 5/1988 | Bednarik et al. | 376/260 |

Primary Examiner—Charles T. Jordan
Assistant Examiner—Daniel Wasil
Attorney, Agent, or Firm—John H. Crozier

[57] ABSTRACT

A punch mechanism for remote removal of guide balls from nuclear reactor control rods, includes attachment means for attaching the punch mechanism to means for reversibly lowering the punch mechanism over the top of one of the control rods. The mechanism includes a die and cylinder means operatively connected to the die for axially moving the die in a back-and-forth direction, a die block cooperating with the die, and guide means for self-aligning the punch mechanism so that the die and the die block are automatically aligned with one of the guide balls therebetween when the punch mechanism is lowered over the top of the control rod. When the punch mechanism is lowered into aligned position, activation of the cylinder means will cause the die to advance into the die block, thereby removing the guide ball from the control rod. The punch mechanism is then remotely raised above the control rod, rotated 90 degrees, and lowered to repeat the ball removal procedure. Two more repetitions effect removal of all four balls from the control rod. The procedure may be carried out while the control rod is positioned in a spent fuel pool. The rod may then be removed for crushing.

18 Claims, 3 Drawing Sheets

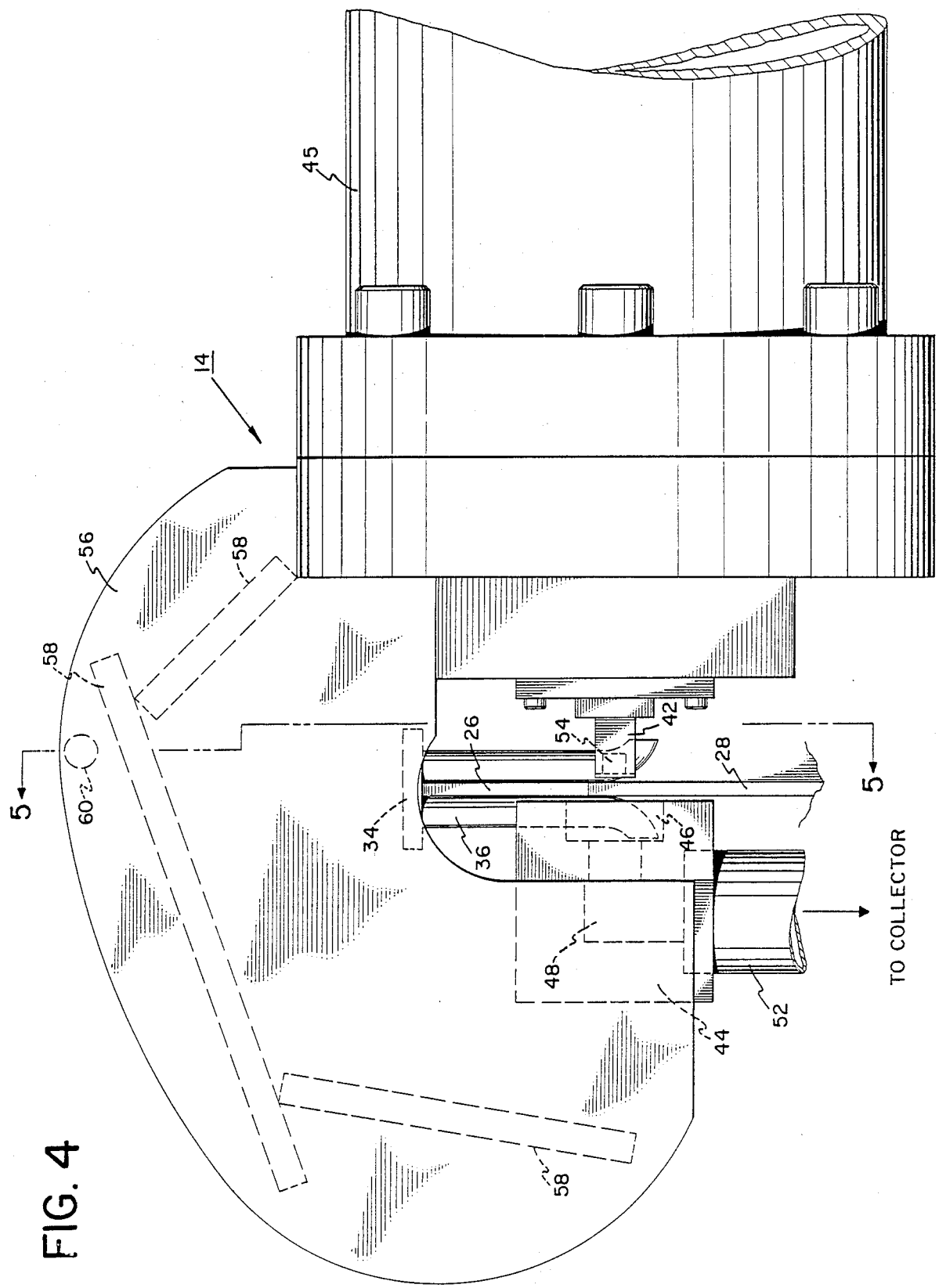

TO COLLECTOR 4,788,027

METHOD AND MEANS FOR REMOTE REMOVAL OF GUIDE BALLS FROM NUCLEAR REACTOR CONTROL RODS

BACKGROUND OF THE INVENTION

1. Field of the Invention

The present invention relates to nuclear reactor installations in general, and more particularly to a novel method and means for remotely removing the guide balls from spent reactor control rods at such installations.

2. Background Art

Nuclear reactors commonly comprise a containment structure enclosing an array of nuclear fuel elements, the radioactive fuel material of which produces large amounts of heat while the fuel is consumed in nuclear chain reactions. A heat transfer medium is circulated around the fuel elements to recover the heat in a usable form. To control the chain reactions, control blades or "rods", are inserted into, or withdrawn from, the array, the rods containing materials such as cadmium or boron which readily absorb nuclear particles taking place in the chain reactions. The rate of the chain reactions decreases as the rods are inserted into, and increases as they are withdrawn from, the array.

As time passes, the control rods become radioactive and brittle, lose their effectiveness, and must be replaced. To accomplish this, the spent control rods, which may be 14–16 feet long, are withdrawn from the reactor by remote control and moved to an area called a spent fuel pool which comprises a large pool of cooled, distilled water, perhaps 40 feet deep, into which pool the rods are positioned underwater in fixtures on the bottom of the pool. The water prevents the escape of radiation, since it is poor absorber of radiation emitted by the radioactive rods.

As originally planned, nuclear reactor installations were to compact their high-level nuclear wastes and send them to centralized waste cites. However, political considerations dictated that such procedure be ended and, consequently, spent fuel pools are rapidly becoming filled. It is thus imperative that the volume of waste in such pools be reduced. One solution to the problem is to crush the control rods to a volume much less than that occupied by their gross dimensions. An impediment to simply removing and crushing the rods is that they include hard guide balls, usually manufactured of Stellite, which becomes extremely radioactive in the reactor. These guide balls constitute a personnel hazard and interfere with the crushing process. It would thus be desirable to be able to remove the guide balls from the spent control rods while the rods are still in the pool and to do so without the need for personnel to enter the pool or otherwise be in proximity to the control rods during the ball removal procedure.

Accordingly, it is a principal object of the present invention to provide a method and means for remote removal of the guide balls from spent nuclear reactor control rods while the rods remain positioned in a spent fuel pool.

It is another object of the present invention to accomplish such removal without the need for personnel to enter the pool.

Other objects of the present invention will in part be apparent and will in part appear hereinafter.

SUMMARY OF THE INVENTION

The present invention provides a method and means for remotely removing the guide balls from spent reactor control rods, which method and means comprise the use of a punch mechanism, preferably hydraulically operated, which is lowered over the top of the cruciform control rod end by remote control. Guide members on the mechanism automatically center it in alignment with a control rod fin so that when operated, the punch removes a slug comprising a segment of the control rod fin surrounding the ball and its retaining means. The punch mechanism is then by remote control raised above the rod, rotated 90 degrees, and again lowered to automatically center itself in alignment with another control rod fin for removal of the guide ball in that fin. Repeating this operation twice more completes removal of the four guide balls from the control rod. The mechanism may include means for retaining the slugs for later remote controlled removal. The control rod, which is much less radioactive than the guide balls, may then be relatively safely removed for crushing.

BRIEF DESCRIPTION OF THE DRAWING

FIG. 4 is a side elevation view of the punch mechanism of the present invention.

DETAILED DESCRIPTION OF THE INVENTION

Figure 1:
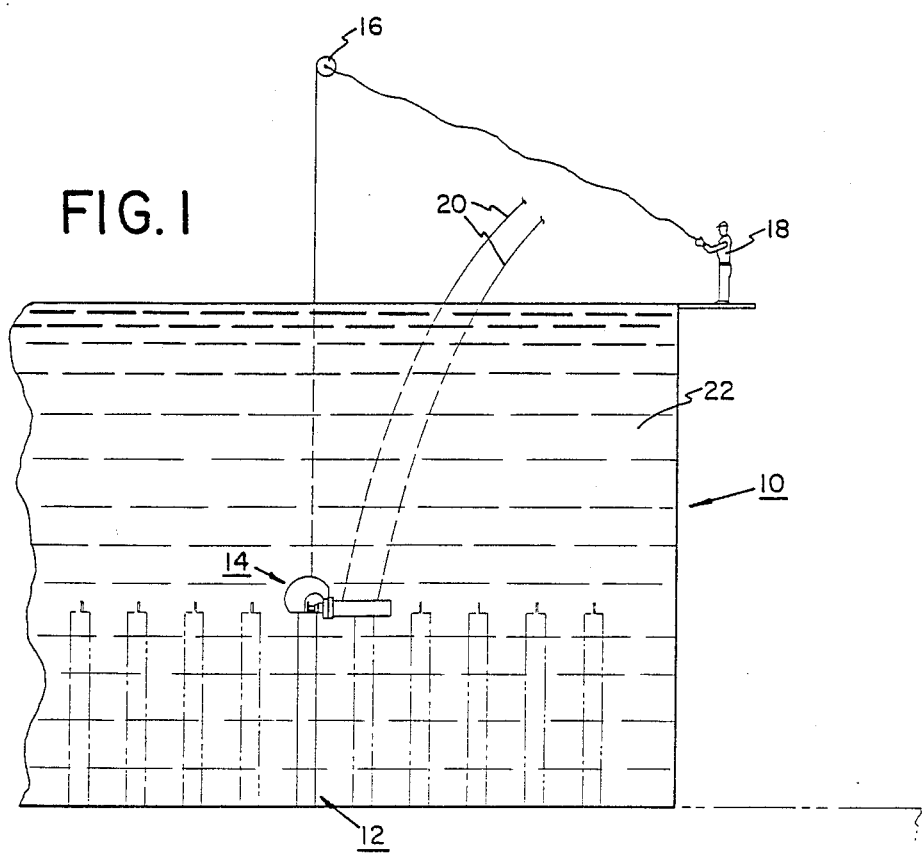
FIG. 1 is a schematic view of a spent fuel pool, showing the remote placement of the punch mechanism of the present invention.

Referring now to the Drawing, FIG. 1 is a schematic view of a spent fuel pool, generally indicated by the reference numeral 10, in which there is positioned a control rod, generally indicated by the reference numeral 12, which may be assumed to be one of a plurality of such rods in pool 10. The punch mechanism of the present invention, generally indicated by the reference numeral 14, is shown positioned over control rod 14 by means of hoist 16 controlled by a human operator 18. Control lines 20 provide means for operating the punch mechanism. Pool 10 contains distilled water 22 which is cooled by means not shown. While the means for lowering punch mechanism 14 over control rod 12 may be as indicated, any of a number of well known means may be employed that is suitable for lowering, raising, and rotating punch mechanism 14, the one chosen not being part of, nor material for the practicing of, the present invention.

Figure 2:
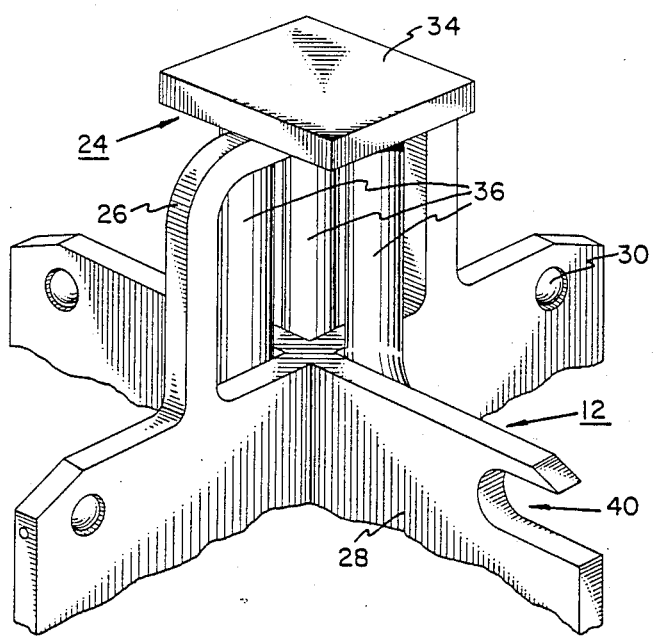
FIG. 2 is a perspective view of the top of a nuclear reactor control rod showing the self-positioning means of the punch mechanism of the present invention.
Figure 3:
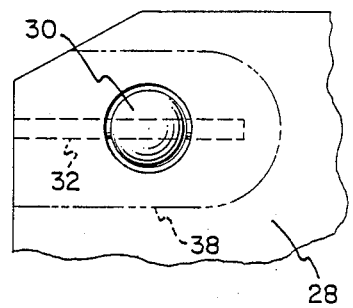
FIG. 3 is a detail of a control rod fin showing the placement of a guide ball.

Referring now to FIG. 2, the self-positioning means of punch mechanism 14, generally indicated by the reference numeral 24, is shown positioned on the upper portion of control rod 12. Control rod 12 includes a handle 26, fins, as at 28, and guide balls, as at 30, each of which balls is rotatably held in control rod 12 by means of a pin 32, as shown on FIG. 3. Self-positioning means 24 includes a stop plate 34, which rests on handle 26 and holds punch mechanism 14 in proper vertical alignment relative to control rod 12, and includes guide tubes 36, which guide punch mechanism 14 in proper rotational alignment relative to the control rod as the punch mechanism is lowered over the control rod. In removing a guide ball 30, punch mechanism 14 removes a slug comprising a section of control rod fin 28 surrounding the ball and pin 32 as indicated by dashed line 38 on FIG. 3 and by a hole 40 in fin 28 where a ball has been removed therefrom.

Figure 5:
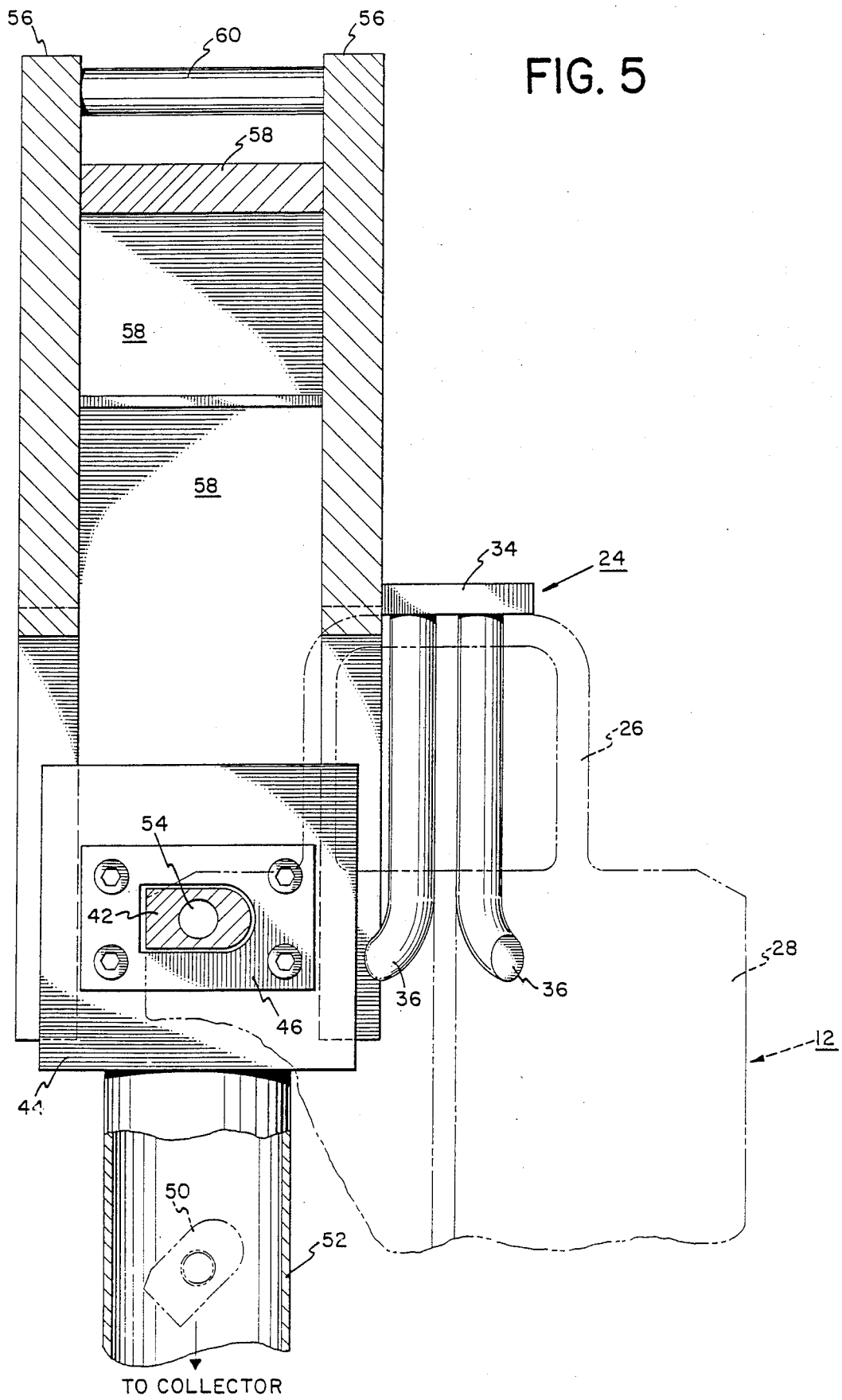
FIG. 5 is a sectional side view of the punch mechanism of the present invention.

FIG. 4 is a side elevation of punch mechanism 14 and FIG. 5 is a sectional view thereof in which a die 42 is operatively connected to cylinder means 45 for back-and-forth axial motion of the die. Cylinder means 45 may be of any of a number of well known types, but preferably is of the hydraulic, double-acting type; however, the actual cylinder means employed is not part of, nor important to the practicing of, the present invention. Punch mechanism 14 includes a die block holder 44 in which is positioned a die block 46 which defines a channel 48 through which slugs, as at 50, may pass to a collector tube 52 and thence to a collector (not shown). Die 42 has a depression and chamber 54 therein to accommodate an end of guide ball 30 and any debris as slug 50 is being removed from fin 28. Self-positioning means 24, die block holder 44, and cylinder means 45 are attached to, and rigidly held in position by, braces 56 which are reinforced by support plates 58 positioned as shown.

Pin 60 is shown as an attachment point for a hoisting mechanism; however, the actual position of it or other attachment means can only be determined once cylinder means 45 is selected, so that pin 60, or its equivalent, can be positioned at the balance point.

In FIGS. 4 and 5, it can be seen that the lower ends of guide tubes 36 are bent outwards from the longitudinal axis of self-positioning means 24, thus presenting a relatively open space at the bottom of the self-positioning means to facilitate positioning punching mechanism 14 over control rod 12.

In operation, punch mechanism 14 is lowered by hoist 16, or by other means, over control rod 12 from which guide balls 30 are to be removed. Guide tubes 36 engage fins 28 and position die 42 and die block 46 in alignment with one of guide balls 30 therebetween. Cylinder means 45 is then activated to advance die 42 into die block 46, thus removing slug 50 from fin 28. Included in slug 50 are guide ball 30 and pin 32, as indicated on FIG. 3. Slug 50 then passes through channel 48 and then may fall through collector tube 52 to a collector (not shown) which may have a bayonet-type connection to facilitate robotic removal. Punch mechanism 14 is then raised by hoist 16, rotated 90 degrees in one direction, lowered over control rod 12 so that a second ball 30 is in alignment with die 42 and die block 44, and the above punching procedure repeated. Punch mechanism 14 is then again raised by means of hoist 16, rotated 90 degrees in the same direction, lowered, and a third guide ball 30 removed. Repeating once again the procedure removes the last guide ball 30. Punch mechanism 14 is then raised by means of hoist 16 and moved to another control rod where the ball-removal procedure is repeated. The operation is completely remote without the need for personnel to be near the highly-radioactive guide balls.

Thus, what has been described is a novel method and means for the remote removal of guide balls from nuclear reactor control rods, which comprises a punch mechanism which is lowered over the control rod and which self-aligns a die and a die block with one of the balls to be removed. Activation of cylinder means in the punch mechanism causes the die to advance into the die block, removing the ball from the control rod. Successively repeating the procedure three times effects removal of all balls from the control rod.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limited sense.

It is also to be understood that the following claims are intended to cover all of the generic and specific features of the invention herein described, and all statements of the scope of the invention which, as a matter of language, might be said to fall therebetween.

I claim:

1. A punch mechanism for remote removal of guide balls from nuclear reactor control rods, comprising:
    (a) attachment means for attaching said punch mechanism to means for reversibly lowering said punch mechanism over the top of one of said control rods;
    (b) a die;
    (c) cylinder means operatively connected to said die for axially moving said die in a back-and-forth direction;
    (d) a die block cooperating with said die; and
    (e) guide means for self-aligning said punch mechanism so that said die and said die block are automatically aligned with one of said guide balls when said punch mechanism is lowered over the top of said control rod;

whereby, when said punch mechanism is lowered over the top of said control rod and said die and said die block are aligned with said guide ball therebetween, activation of said cylinder means will cause said die to advance into said die block thereby removing said guide ball from said control rod.

2. A method of remotely removing guide balls from nuclear reactor control rods using a punch mechanism, comprising:
    (a) providing attachment means in said punch mechanism for attaching said punch mechanism to means for reversibly lowering said punch mechanism over the top of one of said control rods;
    (b) providing a die within said punch mechanism;
    (c) providing cylinder means within said punch mechanism operatively connected to said die for axially moving said die in a back-and-forth direction;
    (d) providing a die block within said punch mechanism cooperating with said die;
    (e) providing guide means within said punch mechanism for self-aligning said punch mechanism so that said die and said die block are automatically aligned with a first one of said guide balls therebetween when said punch mechanism is lowered over the top of said control rod;
    (f) lowering said punch mechanism over said control rod so that said die, said die block, and said first guide ball are in alignment; and
    (g) then operating said cylinder means so that said die advances into said die block, thereby removing said first guide ball from said control rod.

3. The method of claim 2, further comprising:
    (h) then raising said punch mechanism above said control rod;

(i) then rotating said punch mechanism 90 degrees in one direction;

(j) then lowering said punch mechanism over said control rod so that said die and said die block are in alignment with a second one of said guide balls therebetween; and (k) then operating said cylinder means so that said die advances into said die block, thereby removing said second guide ball from said control rod.

4. The method of claim 3, further comprising:

(l) then repeating the steps of claim 3 to remove third and fourth ones of said guide balls from said contrad rod.

5. The punch mechanism of claim 1, wherein said guide means comprises three parallel guide tubes disposed so that the longitudinal axes thereof are parallel to the longitudinal axis of said control rod and spaced apart such that when said punch mechanism is in place over said control rod, said guide tubes closely fit three of four intersections formed by orthogonally disposed from fins comprising said control rod.

6. The method of claim 2, wherein said guide means comprises three parallel guide tubes disposed so that the longitudinal axes thereof are parallel to the longitudinal axis of said control rod and spaced apart such that when said punch mechanism is in place over said control rod, said guide tubes closely fit three of four intersections formed by orthogonally disposed four fins comprising said control rod.

7. The punch mechanism of claim 5, wherein said the lower ends of said guide tubes are bent away from the central axis of said guide means thereby defining a relatively large opening at the bottom of said guide means to facilitate lowering of said punch means over said control rod.

8. The method of claim 6, wherein said the lower ends of said guide tubes are bent away from the central axis of said guide means thereby defining a relatively large opening at the bottom of said guide means to facilitate lowering of said punch means over said control rod.

9. The punch mechanism of claim 1, wherein said guide means includes means to rest on top of a control rod handle, thereby orienting said punch mechanism in vertical alignment with said control rod.

10. The method of claim 2, wherein said guide means includes means to rest on top of a control rod handle, thereby orienting said punch mechanism in vertical alignment with said control rod.

11. The punch mechanism of claim 1, wherein said die and said die block are sized such that said ball can be removed by removing a portion of material of said control rod surrounding said ball and a pin holding said ball in said control rod.

12. The method of claim 2, wherien said die and said die block are sized such that said ball is removed by removing a portion of material of said control rod surrounding said ball and a pin holding said ball in said control rod.

13. The punch mechanism of claim 11, wherein the material removed from said control rod cna pass through a channel defined in said die block.

14. The method of claim 12, wherein the material removed from said control rod passes through a channel defined in said die block.

15. The punch mechanism of claim 13, wherein the removed material can pass from said channel through a tube to a collector.

16. The method of claim 14, wherein the removed material passes from said channel through a tube to a collector.

17. The punch mechanism of claim 1, wherein said cylinder means is of the double-acting hydraulic type.

18. The method of claim 1, wherein said cylinder means is of the double-acting hydraulic type.

* * * * *